United States Patent [19]

Scovazzo et al.

[11] Patent Number: 6,036,746
[45] Date of Patent: Mar. 14, 2000

[54] CONDENSER SYSTEM FOR INDEPENDENTLY CONTROLLING HUMIDITY AND TEMPERATURE OF TREATABLE AIR IN A CLOSED ENVIRONMENT

[75] Inventors: Paul Scovazzo; Paul W. Todd, both of Boulder, Colo.

[73] Assignee: University Technology Corporation, Boulder, Colo.

[21] Appl. No.: 09/159,296

[22] Filed: Sep. 23, 1998

[51] Int. Cl.$^7$ .................................................. B01D 53/22
[52] U.S. Cl. ........................ 95/52; 95/289; 96/8; 96/10; 96/221
[58] Field of Search .................................. 95/45, 47, 52, 95/54, 288, 289; 96/4, 7, 8, 10, 221

[56] References Cited

U.S. PATENT DOCUMENTS

| | | | |
|---|---|---|---|
| 2,223,586 | 12/1940 | Thomas | 96/10 |
| 2,433,741 | 12/1947 | Crawford | 95/52 |
| 2,506,656 | 5/1950 | Wallach et al. | 95/52 |
| 2,517,499 | 8/1950 | McGrath | 95/52 X |
| 3,420,069 | 1/1969 | Booth | 95/52 X |
| 3,786,859 | 1/1974 | Day | 165/21 |
| 3,801,011 | 4/1974 | Guehler et al. | 239/34 |
| 4,014,382 | 3/1977 | Heath | 165/60 |
| 4,048,993 | 9/1977 | Dobritz | 95/52 X |
| 4,135,370 | 1/1979 | Hosoda et al. | 62/274 |
| 4,186,873 | 2/1980 | Geisler et al. | 236/44 A |
| 4,268,279 | 5/1981 | Shindo et al. | 95/46 |
| 4,290,480 | 9/1981 | Sulkowski | 165/21 |
| 4,750,545 | 6/1988 | Hile et al. | 165/20 |
| 4,789,097 | 12/1988 | Anderson et al. | 165/20 X |
| 4,873,835 | 10/1989 | Pojey et al. | 95/50 X |
| 4,911,357 | 3/1990 | Kitamura | 236/44 E |
| 5,059,291 | 10/1991 | Yamauchi et al. | 204/153.22 |
| 5,230,466 | 7/1993 | Moriya et al. | 236/44 A |
| 5,353,862 | 10/1994 | Akiyama | 165/21 |
| 5,368,786 | 11/1994 | Dinauer et al. | 261/130 |
| 5,400,608 | 3/1995 | Steed et al. | 62/91 |
| 5,578,753 | 11/1996 | Weiss et al. | 73/335.02 |
| 5,598,971 | 2/1997 | Winther et al. | 236/44 A |
| 5,611,842 | 3/1997 | Friesen et al. | 95/45 X |
| 5,800,595 | 9/1998 | Wright | 95/288 |

FOREIGN PATENT DOCUMENTS

| | | | |
|---|---|---|---|
| 61-146319 | 7/1986 | Japan | 95/47 |
| 62-227492 | 10/1987 | Japan | 95/52 |
| 1-070183 | 3/1989 | Japan | 95/52 |

OTHER PUBLICATIONS

Newbold, D.D., Analysis of a Membrane–Based Condensate Recovery Heat Exchanger (CRX), SAE International, 23rd International Conference of Environmental Systems, Jul. 12–15, 1993.

Noyes, Gary, Microporous Hydrophobic Hollow Fiber Modules for Gas–Liquid Phase Separation in Microgravity, SAE International, 23rd International Conference of Environmental Systems, Jul. 12–15, 1993.

Duffie, N.A. et al, Humidity and Temperature Control in the Astroculture™ Flight Experiment, SAE International, 23rd International Conference of Environmental Systems, Jul. 12–15, 1993.

Ray, R.J., A Membrane–Base Subsystem for Water–Vapor Recovery From Plant–Growth Chambers, NASA Contractor Report, NASA Contract NAS2–13345, Sep. 1992.

*Primary Examiner*—Robert H. Spitzer
*Attorney, Agent, or Firm*—Emery L. Tracy

[57] ABSTRACT

A condenser system for controlling vapor concentration contained in a flowing airstream is provided. The flowing airstream has an initial temperature upon entering the condenser system and a final temperature upon exiting the condenser system. The condenser system has a membrane member allowing mass transfer of the vapor therethrough with the airstream contacting the membrane member. A condensing member diffuses the vapor from the airstream through the membrane member. An insulating layer is positioned between the membrane member and the condensing member with the insulating layer inhibiting heat transfer between the flowing airstream and the condensing member wherein the final temperature of the airstream is substantially equal to the initial temperature of the airstream.

20 Claims, 2 Drawing Sheets

CONDENSER SYSTEM FOR INDEPENDENTLY CONTROLLING HUMIDITY AND TEMPERATURE OF TREATABLE AIR IN A CLOSED ENVIRONMENT

BACKGROUND OF THE INVENTION

1. Field of the Invention

This invention relates generally to a condenser system for controlling humidity of treatable air while maintaining constant temperature and, more particularly, it relates to a microporous membrane positioned between treatable air or other vapor mixtures and a cold water/air interface allowing mass transfer between the treatable air or other vapor mixtures and the interface while hindering heat transfer between the treatable air or other vapor mixtures and the interface.

2. Description of the Prior Art

In the past, most climate control systems have attempted to control both air temperature and water vapor content. But, since air temperature and water vapor capacity are linked, the air temperature and the water vapor capacity are usually are not controlled independently. Instead, temperature is first adjusted (reduced) to achieve the desired water vapor content and then adjusted (increased) to reach the desired final temperature. Adjusting the temperature twice requires additional energy and reduces efficiency of the dehumidifier.

For instance, in the prior art climate control members, to change the humidity of air (e.g., changing the amount of water vapor in the air) without altering the temperature, two or more unit operations were necessary. For example, in order to alter eighty (80%) percent relative humidity air at twenty-five (25° C.) degrees Celsius to seventy (70%) percent relative humidity air at twenty-five (25° C.) degrees Celsius, at least the three following steps were required:

1. Cool the air to nineteen (19° C.) degrees Celsius;
2. Separate the condensed water from the bulk air which would be at one-hundred (100%) percent relative humidity; and
3. Heat the remaining bulk air from nineteen (19° C.) degrees Celsius to twenty-five (25° C.) degrees Celsius.

Step 3 from the above conventional process represents the inherent overall process inefficiency since the energy required to reheat the bulk air is in addition to the energy used to initially cool the air in Step 1. Thermodynamically, the overall energy expended in the process is always greater than latent heat of condensation requirements.

In the art, an alternative process currently used for some industrial applications is as follows:

1. Pressurize the air with a compressor unit operation; and
2. Pass the pressurized air through a water vapor selective membrane.

The above-described conventional process is only practical for some industrial applications where the end use of the air is at high pressures. The pressurizing process would be too costly to adapt to ambient pressure uses of air such as air conditioning for buildings and the like or other enclosed environments environmental controls.

In order to overcome the inherent shortcomings of the above processes, there have been attempts in the prior art using porous membranes to stabilize the cold water/air interface. Unfortunately, however, the conventional membrane systems do not actually insulate the process of mass transfer from heat transfer. In fact, there is a strong interrelationship between changes in humidity and temperature during the operation of the conventional membrane-based humidity control processes in the prior art.

Another conventional membrane process includes a process called "membrane-gap distillation". In the membrane-gap distillation process, a vapor gap placed between a multiple component "hot" liquid phase and a condensing "cold" surface increases the thermal efficiency of the membrane-gap distillation processes. The membrane-gap distillation process, however, changes the ratio of the components in a liquid mixture via vaporization followed by condensation. Therefore, the membrane-gap distillation process is for changing the relative concentrations of the liquid compounds and not the changing of relative concentrations of the vapor compounds which is dehumidification.

Accordingly, there exists a need for an apparatus and method for changing humidity while maintaining constant temperature. Additionally, a need exists for an apparatus and method which utilizes a membrane to change the humidity of air while maintaining a constant temperature. Furthermore, there exists a need for an apparatus and method which positions a microporous membrane between treatable air and a cold water/air interface allowing mass transfer between the treatable air and the interface while hindering heat transfer between the treatable air and the interface.

SUMMARY

The present invention is a condenser system for controlling the percentage of water vapor and other condensing vapors contained in a flowing airstream. The flowing airstream has an initial temperature upon entering the condenser system and a final temperature upon exiting the condenser system. The condenser system comprises a membrane member allowing mass transfer of the vapor therethrough with the airstream contacting the membrane member. A condensing member diffuses the vapor from the airstream through the membrane member. An insulating layer is positioned between the membrane member and the condensing member. The insulating layer inhibits heat transfer between the flowing airstream and the condensing member wherein the final temperature of the airstream is substantially equal to the initial temperature of the airstream.

In an embodiment of the present invention, the membrane member is a microporous hydrophobic membrane. Preferably, the membrane member is constructed from a polypropylene material. Furthermore, preferably, the membrane member has a pore size of approximately 0.05 $\mu$m.

In another embodiment of the present invention, the insulating layer is a stagnant air gap. Preferably, the stagnant gas is air. Furthermore, preferably, the gap is substantially free from convective heat transfer. Additionally, preferably, the gap has a substantially steady state concentration profile.

In still another embodiment of the present invention, the membrane member further comprises a plurality of channeling membrane fibers for carrying the airstream through the membrane member.

In yet another embodiment of the present invention, the condensing member is a cold fluid interface. Preferably, the cold fluid interface is a wicking membrane.

The present invention further includes a system for independently controlling humidity and temperature of air in a closed volume. The system comprises membrane means adjacent the air, cold fluid interface means for drawing water vapor from the air, and insulation means between the air and the membrane means for hindering the transfer of heat from the air.

In an embodiment of the present invention, the membrane means is a microporous hydrophobic membrane.

In another embodiment of the present invention, the insulation means comprises a stagnant gas, the stagnant gas defining a gap.

In still another embodiment of the present invention the cold fluid interface is a cold fluid reservoir adjacent the insulation means and opposite the membrane means for diffusing the water vapor from the air and into the cold fluid reservoir. The cold fluid interface causes the vapor to diffuse from the airstream.

The present invention additionally includes a method for independently controlling humidity and temperature of air in a closed volume. The method comprises providing a membrane, moving the air past the membrane, providing a cold surface, insulating the membrane and the air from the cold surface, and drawing water vapor from the air.

In an embodiment of the present invention, the method further comprises insulating the air from the condensing member with a stagnant gas gap.

In another embodiment of the present invention, the method further comprises moving the air through the gap.

In still another embodiment of the present invention, the membrane is a microporous hydrophobic membrane.

In yet another embodiment of the present invention, the method further comprises providing insulation and a cold fluid reservoir adjacent the insulation and opposite the air diffusing the water vapor from the air and into the cold fluid reservoir.

DETAILED DESCRIPTION OF THE PREFERRED EMBODIMENTS

The present application hereby herein incorporates by reference the disclosure of U.S. Provisional patent application, Ser. No. 60/055,477, filed Aug. 12, 1997.

Figure 1:
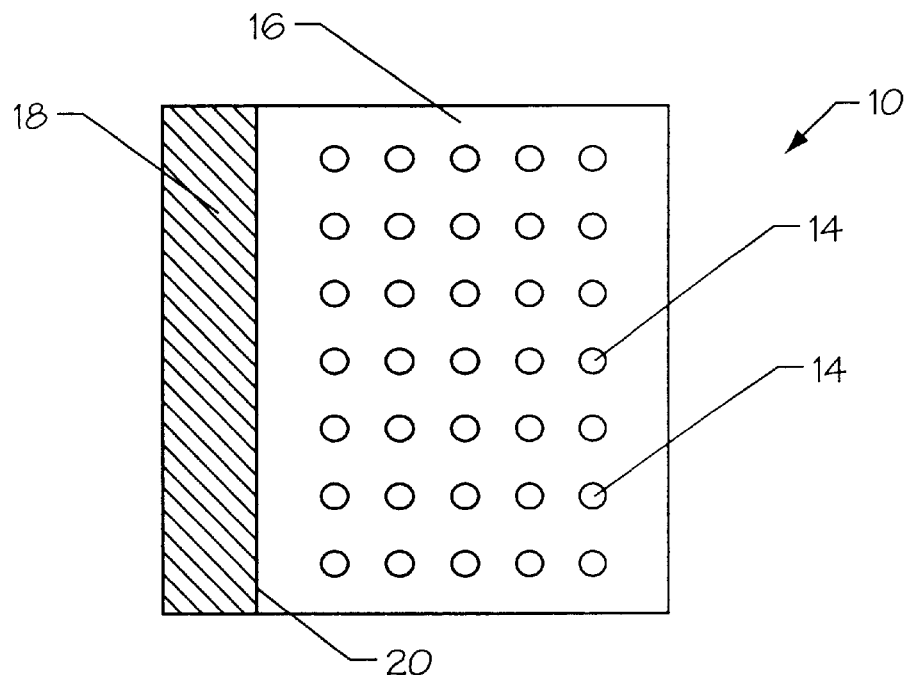
FIG. 1 is a front elevational view of a condenser system for independently controlling humidity and temperature of treatable air in a closed environment constructed in accordance with the present invention.
Figure 2:
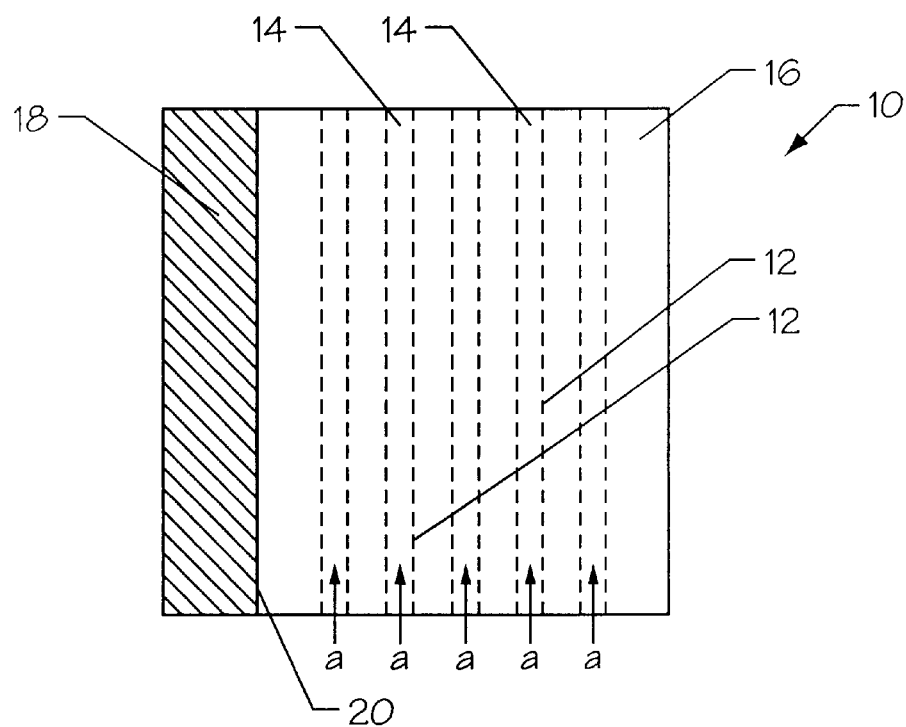
FIG. 2 is a top elevational view of the condenser system for independently controlling humidity and temperature of treatable air in a closed environment constructed in accordance with the present invention.
Figure 3:
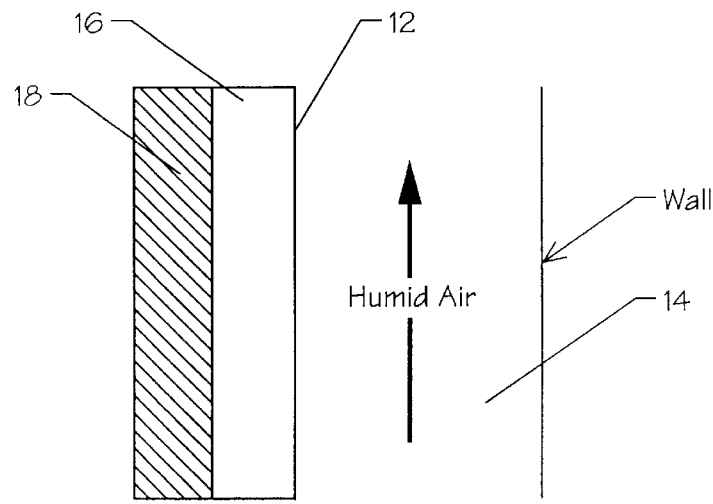
FIG. 3 is a side elevational view of another embodiment of the condenser system for independently controlling humidity and temperature of treatable air in a closed environment constructed in accordance with the present invention.

As illustrated in FIG. 1, the present invention is a condenser system, indicated generally at 10, for independently controlling humidity and temperature of treatable air (as directionally indicated by the arrow in FIG. 2) in a closed environment, e.g., a room or small building. The condenser system 10 separates, in a single unit operation, the control of humidity from heat transfer (temperature changes resulting from the addition or removal of water vapor from the air). In fact, the condenser system 10 of the present invention controls the air temperature and the water vapor content of the air independently of each other. In the condenser system 10 of the present invention, heating or cooling of the air is actually required only for maintaining the target air temperature with no excess heating or cooling being required to cycle air through a conventional temperature shift for dehumidification/reheating. Reducing non-essential heating and cooling increases the efficiency of the condenser system 10 and simplifies the functioning of the condenser system 10, e.g., fewer and simpler mechanical parts.

The condenser system 10 of the present invention has a microporous membrane 12 extending through the condenser system 10. The microporous member 12 creates a wall defining channels 14 in the condenser system 10 through which the air flows. Preferably, the microporous membrane 12 is a microporous hydrophobic membrane. The membrane 12 is preferably constructed from a polypropylene material with a pore size of approximately 0.05 ($\mu$m) micrometer. While the condenser system 10 has been described as being constructed with a certain type of microporous membrane 12 having a particular pore size, it is within the scope of the present invention to utilize any other type of membrane and/or membranes having a different pore size less than that which allows momentum transfer through the membrane. In addition, the membrane material includes, but is not limited to, polypropylene, other polymers, ceramic, or metal microporous membranes, etc.

The condenser system 10 further has an insulating layer 16 between each of the channels 14 defined by the membrane member 12 and a condensing membrane 18. The insulating layer 16 is preferably an area of stagnant gas. The stagnant gas area defines a gap between the treatable air and the condensing member 18. The insulating layer 16 provides humidity control with minimal heat transfer while the microporous nature of the microporous membrane 12 allows mass transfer (the addition or removal of water vapor) to continue unhindered and uninhibited. Therefore, the condenser system 10 of the present invention dehumidifies the treatable air while substantially maintaining the temperature of the entire condenser system 10.

The condensing member 18 has a cold water/air interface 20 adjacent the insulating layer 16 and substantially opposite the microporous membrane 12. The cold water/air interface 20 causes the water vapor in the treatable air to be drawn through the insulating layer 16 and the membrane 12. Preferably, the condensing member 18 is a cold surface or a wicking member.

Figure 4:
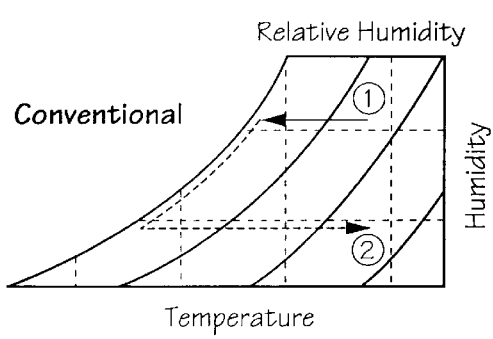
FIG. 4 is a psychrometric chart graph illustrating a prior art conventional dehumidification cycle.

There are numerous advantages of the condenser system 10 of the present invention over the conventional systems of the prior art. For instance, the condenser system 10 of the present invention accomplishes in a single, energy efficient unit, what existing prior art processes require in multiple, energy inefficient units (e.g., a heater or a compressor). For instance, as illustrated in FIG. 4, the dehumidification process in a conventional heat exchanger condenser first cools the humid air to its dew point. The humid air is then further cooled resulting in condensation of water on the cooling surface. The water is removed by gravity flow or entrainment in the air stream. The latter process can lead to health hazards in that it leads to moisture in air conditioning ducts and biological growths with the exit air being theoretically at one-hundred (100%) relative humidity.

Figure 5:
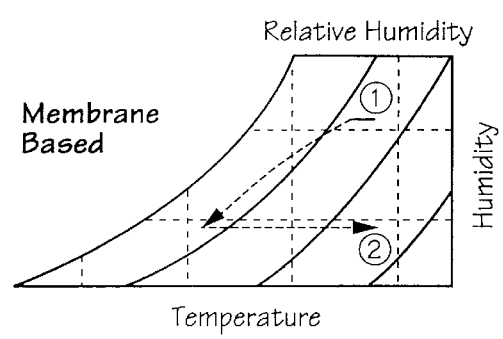
FIG. 5 is a psychrometric chart graph illustrating the dehumidification cycle of the condenser system constructed in accordance with the present invention.

On the other hand, as illustrated in FIG. 5, with the condenser system 10 of the present invention, heat removed from the air is a function of the boundary resistances while in the standard heat exchanger the air also gives up energy to assist in the condensation of the water vapor. The end result is that with the condenser system 10 of the present invention, the exit air theoretical relative humidity is below one-hundred (100%) percent.

Additionally, the condenser system 10 of the present invention allows a higher thermal efficiency, a reduction in unit operations, and the ability to facilitate accurate environmental control by separating humidity control from temperature control.

Furthermore, the condenser system 10 of the present invention does not require increased pressure. In fact, the condenser system 10 of the present invention only requires a cold water/air interface. The condenser system 10 separates two vapor components by merely condensing one of the components (namely water) into a pure liquid phase requiring only a heat sink.

The condenser system 10 of the present invention has broad applications in building air conditioning systems and other environments requiring precise environmental controls such as clean room manufacturing or medical life support systems (e.g., baby incubators). In building air conditioning systems, the condenser system 10 offers high energy efficiency and pathogen control within air-conditioning systems due to the elimination of high-humidity zones resulting from the cooling bulk air to dew point in conventional systems. In fact, the separation of humidity control from temperature control facilitates the environmental control of any enclosed system.

The condenser system 10 of the present invention, as mentioned above, is also useful for medical equipment manufacturers when operating in a humidification mode. The condenser system 10 of the present invention allows medical equipment manufacturers to humidify a life support system without fluctuations in air temperature (excessive heating or cooling).

Furthermore, due to the increase in environmental control with the condenser system 10, the manufacturers of "clean rooms" could also benefit from the present invention.

Nevertheless, in any application, the condenser system 10 has the following advantages:

1. Higher thermal efficiency;
2. Fewer unit operation; and
3. Accurate environmental control through the separation of humidity control from temperature control.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A method for independently controlling humidity and temperature of air in a closed volume, the method comprising:

providing a membrane;

moving the air past the membrane;

providing a cold surface;

insulating the membrane and the air from the cold surface; and drawing water vapor from the air.

2. The method of claim 1 and further comprising insulating the air from the cold surface with a stagnant gas gap.

3. The method of claim 2 and further comprising moving the air through the gap.

4. The method of claim 1 wherein the membrane is a microporous hydrophobic membrane.

5. The method of claim 1 and further comprising providing insulation and a cold fluid reservoir adjacent the insulation and opposite the air diffusing the water vapor from the air and into the cold fluid reservoir.

6. A condenser system for controlling vapor concentration contained in a flowing airstream, the flowing airstream having an initial temperature upon entering the condenser system and a final temperature upon exiting the condenser system, the condenser system comprising:

a membrane member allowing mass transfer of the vapor therethrough, the airstream contacting the membrane member;

a condensing member for diffusing the vapor from the airstream through the membrane member;

an insulating layer positioned between the membrane member and the condensing member, the insulating layer inhibiting heat transfer between the flowing airstream and the condensing member; and wherein the final temperature of the airstream is substantially equal to the initial temperature of the airstream.

7. The condenser system of claim 6 wherein the membrane member is a microporous hydrophobic membrane.

8. The condenser system of claim 7 wherein the microporous hydrophobic membrane member is constructed from a polypropylene material.

9. The condenser system of claim 8 wherein the membrane member has a pore size of approximately 0.05 $\mu$m.

10. The condenser system of claim 6 wherein the insulating layer is a stagnant gas gap.

11. The condenser system of claim 10 wherein the stagnant gas is air.

12. The condenser system of claim 10 wherein the gap is substantially free from convective heat transfer.

13. The condenser system of claim 10 wherein the gap has a substantially steady state concentration profile.

14. The condenser system of claim 6 and further comprising a plurality of channeling membrane fibers for carrying the airstream through the membrane member.

15. The condenser system of claim 6 wherein the condensing member is a cold fluid interface.

16. The condenser system of claim 15 wherein the cold fluid interface is a wicking membrane.

17. A system for independently controlling humidity and temperature of air in a closed volume, the system comprising:

membrane means adjacent the air;

cold fluid interface means for drawing water vapor from the air; and insulation means between the air and the membrane means for hindering the transfer of heat from the air.

18. The system of claim 17 wherein the membrane means is a microporous hydrophobic membrane.

19. The system of claim 17 wherein the insulation means comprises a stagnant gas, the stagnant gas defining a gap.

20. The system of claim 17 wherein the cold fluid interface is a cold fluid reservoir adjacent the insulation means and opposite the membrane means for diffusing the water vapor from the air and into the cold fluid reservoir.

* * * * *